(12) United States Patent
Lee

(10) Patent No.: US 11,108,898 B1
(45) Date of Patent: Aug. 31, 2021

(54) PACKETS WITH HEADER REPLICAS FOR CONTENTION RESOLUTION IN COMMUNICATIONS SYSTEMS

(71) Applicant: Amazon Technologies, Inc., Seattle, WA (US)

(72) Inventor: Jung Joo Lee, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/704,705

(22) Filed: Dec. 5, 2019

(51) Int. Cl.
| | |
|---|---|
| *H04L 29/06* | (2006.01) |
| *H04W 74/08* | (2009.01) |
| *H04W 72/04* | (2009.01) |
| *H04L 1/00* | (2006.01) |
| *H04W 74/00* | (2009.01) |

(52) U.S. Cl.
CPC .......... *H04L 69/22* (2013.01); *H04L 1/0061* (2013.01); *H04L 1/0083* (2013.01); *H04W 72/0446* (2013.01); *H04W 74/006* (2013.01); *H04W 74/0833* (2013.01)

(58) Field of Classification Search
CPC ..... H04L 69/22; H04L 1/0061; H04L 1/0083; H04W 72/0446; H04W 74/0833; H04W 74/006
See application file for complete search history.

(56) References Cited

U.S. PATENT DOCUMENTS

| | | | | |
|---|---|---|---|---|
| 4,736,371 | A * | 4/1988 | Tejima | H04B 7/2123 370/236 |
| 2006/0171418 | A1* | 8/2006 | Casini | H04L 49/90 370/474 |
| 2010/0054131 | A1* | 3/2010 | del Rio Herrero | H04B 1/71072 370/236 |
| 2010/0260146 | A1* | 10/2010 | Lu | H04L 12/4633 370/331 |
| 2015/0351043 | A1* | 12/2015 | De Gaudenzi | H04B 7/216 370/329 |

(Continued)

OTHER PUBLICATIONS

Enrico Casini, et al., Contention Resolution Diversity Slotted Aloha (CRDSA): An Enhanced Random Access Scheme for Satellite Access Packet Networks, IEEE Transactions on Wireless Communications, vol. 6, No. 4, pp. 1408-1419, Apr. 2007, 12 pages.

(Continued)

*Primary Examiner* — Jael M Ulysse
(74) *Attorney, Agent, or Firm* — Kilpatrick Townsend & Stockton, LLP

(57) ABSTRACT

Techniques for improving the packet error rate associated with the processing of packets are described. In an example, a system receives a first packet in a first slot of a frame and a second packet in a second slot of the frame. The first packet includes a first header and a replica of the first header. The first header indicates that the first packet is associated with the second packet. The system generates a second header based at least in part on the first header and the replica. The second header indicates an association with the second packet. The system generates a third packet that includes the second header and performs, based at least in part on the third packet, a contention resolution process on packets associated with slots of the frame.

20 Claims, 10 Drawing Sheets

(56) References Cited

U.S. PATENT DOCUMENTS

| | | | | |
|---|---|---|---|---|
| 2015/0372717 | A1* | 12/2015 | Schrum, Jr. | H04L 5/003 |
| | | | | 370/458 |
| 2016/0149627 | A1* | 5/2016 | De Gaudenzi | H04W 74/0833 |
| | | | | 370/329 |
| 2017/0125028 | A1* | 5/2017 | Sinder | H04L 1/0076 |
| 2018/0316479 | A1* | 11/2018 | Rainish | H04L 43/0852 |
| 2019/0230658 | A1* | 7/2019 | Gadat | H04L 1/004 |
| 2019/0297649 | A1* | 9/2019 | Lahouti | H03M 13/255 |
| 2020/0092174 | A1* | 3/2020 | Shokarev | H04L 43/12 |
| 2020/0107310 | A1* | 4/2020 | Wang | H04W 72/046 |

OTHER PUBLICATIONS

Huyen-Chi Bui, et al., An Enhanced Multiple Random Access Scheme for Satellite Communications, Oct. 14, 2011, 6 pages.

Norman Abramson, The Aloha System-Another Alternative for Computer Communications, Fall Joint Computer Conference, pp. 281-285, 1970, 5 pages.

* cited by examiner

PACKETS WITH HEADER REPLICAS FOR CONTENTION RESOLUTION IN COMMUNICATIONS SYSTEMS

BACKGROUND

Satellites can be launched into orbit to provide various functionalities. For example, a communications satellite can create communications channels between devices at different locations on Earth and can relay and amplify radio telecommunications signals exchanged between the devices. The communications satellite can manage the use of the communications channels such for quality of service (QoS) purposes. Of course, other types of satellites can be launched and used, including weather satellite, imaging satellites, and the like. Although their primary design is not for creating communications channels between devices, these satellites may nonetheless receive radio telecommunication signals from ground stations on Earth.

BRIEF DESCRIPTION OF THE DRAWINGS

Various embodiments in accordance with the present disclosure will be described with reference to the drawings, in which.

DETAILED DESCRIPTION

Figure 1:
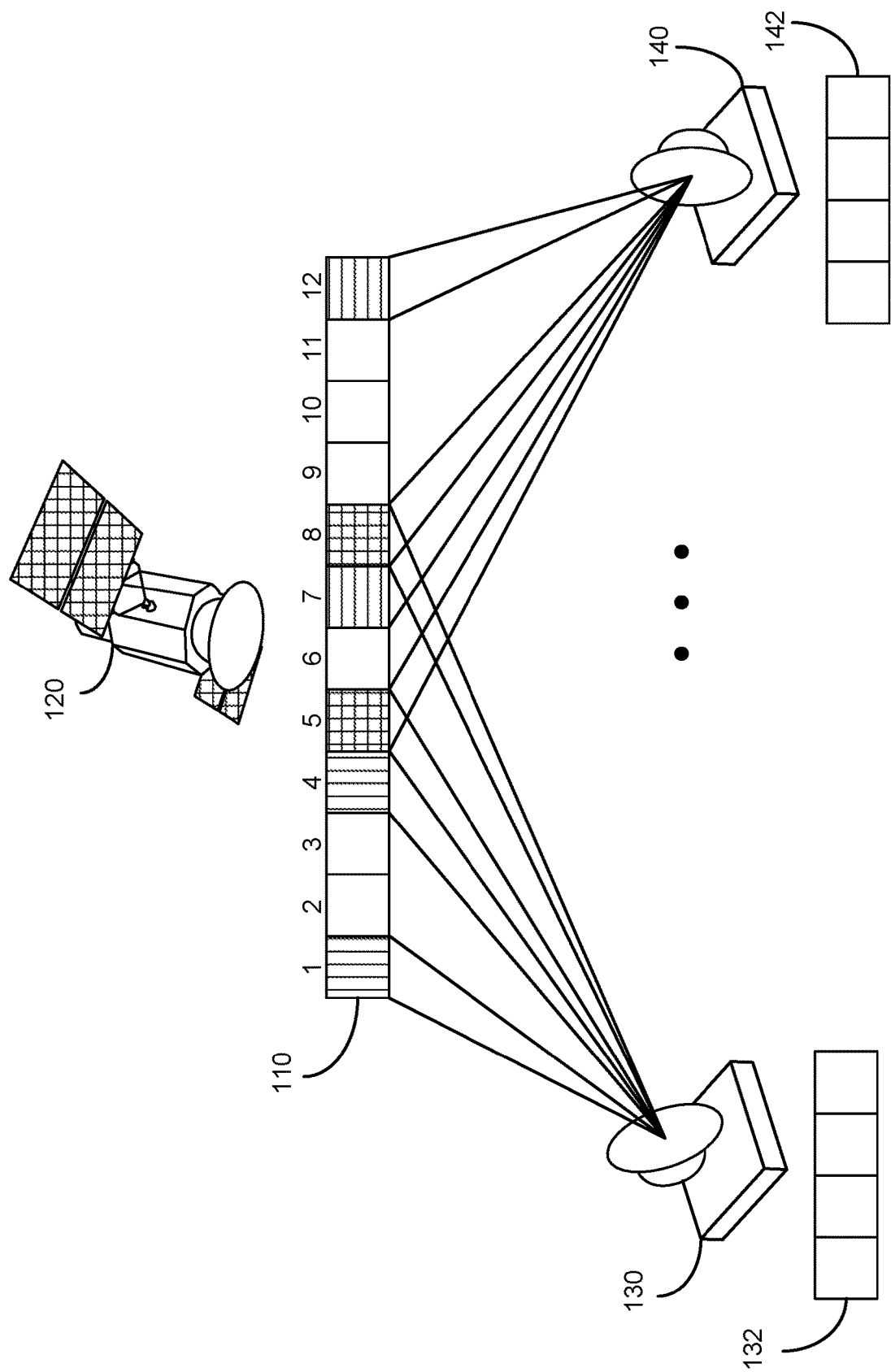
FIG. 1 illustrates an example of a communications channel between a satellite and ground stations, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving a packet error rate (PER) associated with a communications channel, such as a random access channel. In an example, a communications channel is available between a first communications system and multiple second communications systems. Each of the second communications system may send a signal corresponding to a frame of the communications channel, where the signal encodes packets in different slots of the frame. Accordingly, for a same slot of the frame, the first communications system can detect multiple packets originating from multiple ones of the second communications systems. Such packets and such a slot are referred to as colliding packets and a collision slot, respectively. The first communications system performs a contention resolution process based on header information from the packets of the frame to process colliding packets in collision free slots (e.g., slots that do not contain colliding packets). However, the contention resolution process may not always resolve the collisions and, thus, not all packets may be decoded due to different factors, including the signal to noise ratio (SNR), and the PER may increase. For instance, even if the contention resolution process removes detected packets, the noise power may increase because of phase differences and residual noise, thereby potentially impacting the decoding of remaining colliding packets. To improve the PER, the header information in each packet can be replicated a number of times. In particular, a second communications system includes header information and one or more replicas thereof in a packet for transmission to the first communications system. In turn, the first communications system decodes the packet based on the header information and its replica(s). Doing so improves the SNR during the decoding, which in turn allows the application of the contention resolution process to packets (colliding and otherwise) that would have not been decoded due to the SNR and, thus, improves the PER.

To illustrate, consider an example of a satellite in communications with multiple ground stations. An unscheduled uplink channel and one or more scheduled downlink channels exist. Any of the ground stations can request a resource (e.g., bandwidth) on a scheduled downlink channel by sending packets over the unscheduled uplink channel. Accordingly, colliding packets may exist on the unscheduled uplink channel. To resolve the packet collision, the satellite implements a contention resolution diversity slotted Aloha (CRDSA) and successive interference cancellation (SIC) process. To improve the PER of the CRDSA and SIC contention resolution process, the satellite can instruct each of the ground stations to replicate the header in each packet a number of times. Upon receiving packets from ground stations, the satellite derives a new header per received packet based on the header and its replica(s) from the packet and proceeds to perform the CRDSA and SIC contention resolution process by using the new headers. Each new header is derived from a corresponding header and its replica(s) at the physical layer of a receiver of the satellite. Thus, the SNR is increased because the received signal encodes both the header and the replica(s). The new header is provided from the physical layer to the media access control (MAC) layer of the receiver as a MAC header in a MAC packet. Based on the CRDSA and SIC contention resolution process, the receiver processes the MAC packets to resolve collisions. The SNR increase translates into a PER improvement of the CRDSA and SIC contention resolution process. The satellite can accordingly determine resource requests (e.g., bandwidth requests) of the ground stations at an improved PER and, accordingly, allocate downlink resources on the scheduled downlink channels, thereby improving the overall QoS of the communications with the ground stations.

Embodiments of the present disclosure provide several technical advantages. For example, the PER of a contention resolution process implemented by a communications device can be improved (e.g., reduced). Given this improvement, the QoS of the communications with the communications device can be improved (e.g., increased).

In the interest of clarity of explanation, various embodiments of the present disclosure are described in connection with a satellite (e.g., a communications satellite launched into space). However, the embodiments are not limited as such. In particular, the embodiments generally apply to a communications device that includes at least a receiver that implements a contention resolution process to resolve packet collisions. The communications device can act as a relay for data communications between multiple devices, can be merely a receiver of data communications from one or more devices, and/or can be a communications end point of data communications with one or more devices. Further data communications can be performed over one or more types of communications channels, including wireless communications channels such as one relying on radio waves within a particular set of frequency ranges. For instance, the communications device can be a mobile phone, a tablet, a laptop, an Internet of Things (IoT) device, a base station, or any receiver of a communications system.

FIG. 1 illustrates an example of a communications channel 110 between a satellite 120 and a number of ground stations, according to embodiments of the present disclosure. Although two ground stations 130 and 140 are illustrated, embodiments of the present disclosure similarly apply to a larger number of ground stations. In an example, the communications channel 110 is a wireless transmission medium that allows the ground station 130 to transmit data to the satellite 120 and the satellite 120 to transmit the data to the ground station 140, and vice versa. The data communications, whether uplink to the satellite 120 or downlink to the ground stations 130 and 140, can be packetized. Packet collisions can occur and the satellite 120 implements a contention resolution process to resolve packet collisions. In addition, packets received by the satellite 120 for processing through the contention resolution process may each include a header and a number of header replicas.

In an example, the communications channel 110 includes uplink channels and downlink channels. Uplink channels are used for communications from ground stations 130 and 140 to the satellite 120, whereas downlink channels are used for communications from the satellite 120 to the ground stations 130 and 140. Different types of uplink and downlink channels are possible. A first type can support random access, where a channel of the communications channel 110 can be unscheduled to allow random access to the channel. A second type can support controlled access, where a channel of the communications channel 110 can be a scheduled channel to allow controlled access to the channel. For example, the communications channel 110 includes an unscheduled uplink channel and multiple scheduled downlink channels. The unscheduled uplink channel is a random access channel (RACH) shared between the ground stations 130 and 140 and allowing each of the ground stations 130 and 140 to send request one or more resources on a scheduled downlink channel (e.g., bandwidth on the scheduled downlink channel upon a bandwidth request, or use of the scheduled downlink channel upon an initial network entry request). The scheduled downlink channel is a controlled channel having resources usable to a ground station upon a grant and a scheduling of such use by the satellite 120.

A channel of the communications channel 110, whether uplink or downlink and whether scheduled or unscheduled, can be used for the transmission of data. The data may be packetized into packets, and the packets may be transmitted in multiple frames. Each frame represents a digital data transmission unit. In turn, a frame can include a number of slots. A slot can be defined in a time domain (e.g., as a predefined time duration and referred to as a time slot) and/or in the frequency domain (e.g., a predefined set of frequency bands and referred to as a frequency slot). The transmission of a packet in a slot of a frame can include, at a physical layer, encoding the packet into a portion of a radio signal that is transmitted over the channel. For instance, in a time division duplex (TDD) transmission of a packet in a time slot, the portion of the radio signal corresponding to the time slot encodes the packet. The portion of the radio signal is decoded to determine the packet.

In an example, the satellite 120 is a communications satellite deployed in a particular orbit. The satellite 120 can be part of a constellation of communications satellites distributed between one more orbits and/or at one or more altitudes within an orbit, such as in a low Earth orbit (LEO) and/or in a medium Earth orbit (MEO). Alternatively, the satellite 120 can be a communications satellite in a geostationary orbit (GEO). In both cases, the satellite 120 can provide Internet access to user equipment on Earth. For instance, the satellite 120 relays radio signals in particular radio frequency (RF) spectrums (e.g., L band, $K_u$ band, $K_a$ band, V band, or other RF bands) from one place on Earth to another by, for instance, receiving the radio signals from the ground station 130 on Earth or from another communications satellite, amplifying the radio signals, and sending the amplified radio signals to the ground station 140 on Earth or to another communications satellite. The radio signals can be received and/or transmitted over the communications channel 110 and can carry Internet data, although other types of packetized communications data are also possible, such as telephone data, radio data, broadcast data, and the like. A radio signal can be carried by a radio wave in a particular RF spectrum (e.g., L band, $K_u$ band, $K_a$ Band, V band, or other RF bands) and can modulate communications data, such as Internet data and/or another type of communications data.

On the uplink, a receiver of the satellite 120 receives a radio signal from a ground station or another satellite. On the downlink, a transmitter of the satellite 120 transmits a radio signal to a ground station or another satellite. The receiver and the transmitter can be components of a transponder or a communications system of the satellite 120 supporting uplink and downlink operations, including instructing ground stations and/or other satellites about using particular packet structures (e.g., the replicating of headers), generating new packets including new header based on the received packets, and performing contention resolution processes. In an example, the satellite 120 includes multiple receivers and multiple transmitters. For instance, the satellite 120 can include a phased array having thousands or more of receivers and/or transmitters.

Each of the ground stations 130 and 140 includes a number of transmitters and a number of receivers for communications with the satellite's 120 receiver(s) and transmitter(s) over the communications channel 110. Further, each of the ground stations 130 and 140 can act as a relay that receives data from one or more user equipment on Earth (e.g., from network gateways) for transmission to the satellite 120 and that transmits data received from the satellite 120 to such user equipment. The communications with the user equipment can be carried over a communications channel different than the communications channel 110.

In the interest of clarity of explanation, FIG. 1 merely shows an unscheduled uplink channel of the communications channel 110. The ground stations 130 and 140 share the unscheduled uplink channel to send a bandwidth request or an initial network entry request to the satellite 120. Each of ground stations 130 and 140 encodes its request with an error correcting code to generate one codeword which is cut into "N" packets of same length ("N" can vary between the ground stations 130 and 140). The "N" packets of the ground station 130 and the "N" packets of the ground station 140 are illustrated in FIG. 1 as packets 132 and packets 142, respectively, where "N" is equal to four for illustrative purposes. The packets 132 and 142 are transmitted on a frame of the unscheduled uplink channel, where the frame is split into slots (FIG. 1 illustrates the frame as having twelve slots for illustrative purposes). Each ground station 130 and 140 randomly sends its "N" packets in "N" different slots of the frame. Accordingly, some of the packets 132 of the ground station 130 may collide with some of the packets 142 of the ground station 140. As illustrate in FIG. 1 with vertical lines for the packets 132 and horizontal lines for the packets 142, the packets 132 are transmitted in slots one, four, five, and eight, and the packets 142 are transmitted in slots five, seven, eight, and twelve. Packet collisions occur in slots five and eight (illustrated with the crossed lines).

In an example, a combination of techniques are implemented to resolve the packet collisions and decode the packets of the colliding slots (e.g., the third packet of the packets 132 and the first packet of the packets 142 colliding in the fifth slot can each be decoded; similarly, the fourth packet of the packets 132 and the third packet of the packets 142 colliding in the eighth slot can each be decoded). One technique involves using a specific structure of each of the packets 132 and 142. As further illustrated in connection with FIGS. 2-4, the structure of a packet includes one or more replicas of a header of the packet. Another technique involves using a contention resolution process, such as a CRDSA and SIC contention resolution process, as further described in connection with FIGS. 2 and 5.

Figure 2:
FIG. 2 illustrates an example of packet structures for packet transmissions in a communications channel between a satellite and ground stations, according to embodiments of the present disclosure.
Figure 2:
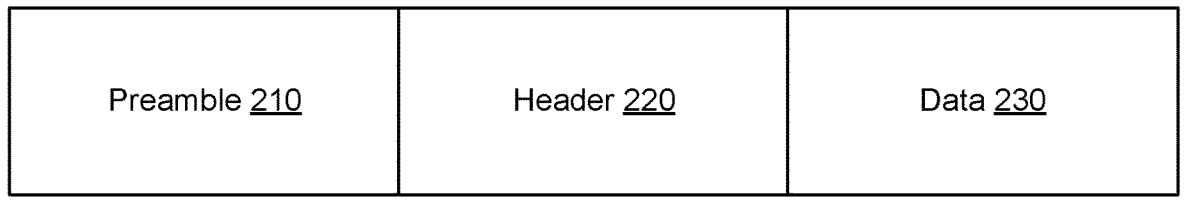
Figure 2:
Figure 2:
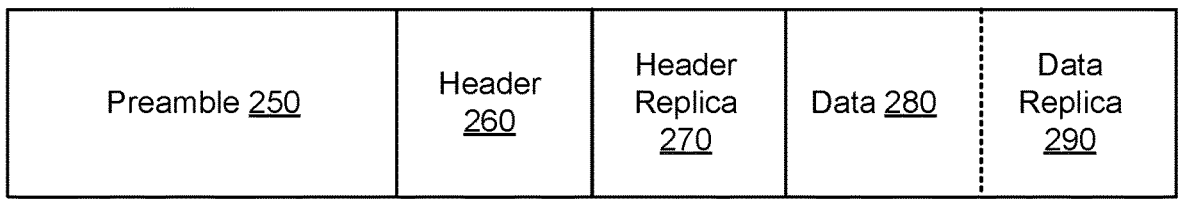

FIG. 2 illustrates an example of packet structures for packet transmissions in a communications channel between a satellite and ground stations, according to embodiments of the present disclosure. In particular, a first packet structure 201 and a second packet structure 202 are illustrated. The first packet structure 201 includes a preamble 210, a header 220, and data 230. In comparison, the second packet structure 202 includes a preamble 250, a header 260, a number of replicas of the header 260 (FIG. 1 illustrates a single header replica 270, although a larger number of header replicas are possible), data 280, and, optionally, a number of replicas of the data 280 (FIG. 1 illustrates a single data replica 290, although a larger number of data replicas are possible).

Given that the header 260 is replicated and, optionally, the data 280 is replicated, a signal encoding the second packet structure 202 has a higher SNR than a signal encoding the first packet structure 201. For instance, the SNR is increased by at least three decibels times the number of replicas of the header 260 (e.g., 3 dB×"number of header replicas"). Accordingly, the second packet structure 202 can be used for the encoding and transmission of packets from a transmitter. In comparison, a receiver can derive new packets from the encoded information to have the first packet structure 201 such a contention resolution process is applied to the derived packets having the first packet structure 201.

In an example, a ground station, such as any of the ground stations 130 and 140 of FIG. 1, transmits packets to a satellite, such as the satellite 120 of FIG. 1, over an unscheduled uplink channel to request bandwidth or initial network entry, where the packets have the second packet structure 202. These packets may be referred to herein as physical layer packets to indicate that these packets are encoded in the signal transmitted by a physical layer of the ground station's transmitter. Similarly, the second packet structure 202 may be referred to as a physical layer packet structure. In turn, the satellite derives packets having the first packet structure 201 and applies a CRDSA and SIC contention resolution process on the derived packets to decode the requests and schedule relevant resources on one or more scheduled downlink channels. The derived packets may be referred to herein as MAC packets to indicate that these packets are output of a physical layer of the satellite's receiver and are used at a MAC layer of the receiver performing the CRDSA and SIC contention resolution process. Similarly, the first packet structure 201 may be referred to as a MAC packet structure. Each of the two packet structures 201 and 202 are described herein next.

As indicated herein above, the first packet structure 201 defines, for a MAC packet, fields including the preamble 210, the header 220, and the data 230 (e.g., a MAC preamble, a MAC header, and MAC data, respectively). According to the first packet structure 201, the MAC packet has a total length of "J" bits. The preamble 210 has a length of "K" bits (where "K" is smaller than "J") and stores a predefined pattern of "K" alternating one and zero bits, allowing communication devices to synchronize their receiver clocks, providing bit-level synchronization. Although not shown, the preamble can be preceded, be followed, and/or include a guard to mark the start and/or end of the preamble. The header 220 has a length of "L" bits (where "L" is smaller than "J") and stores information as a set of bits indicating, among other things, a source MAC address, a destination MAC address, and a request type (e.g., bandwidth request, initial network entry request). To support the CRDSA and SIC contention resolution process, the header 220 also stores signaling information. The signaling information includes an identifier of the ground station and indicates another slot in which a replica of the MAC packet is sent. The indication of the other slot can include the slot position in the frame or an association between the MAC packet and the other slot. This association can indicate that the MAC packet is a first packet in a packet pair that also contains the replica MAC packet. This replica MAC packet is further illustrated in FIGS. 3. and 6 in connection with a description of the CRDSA and SIC contention resolution process. The data 230 has a length of "M" bits (where "M" is smaller than "J," and where the sum of "K," "L," and "M" is smaller than "J") and stores information specific to the request (e.g., the information identifies the requested resources, such as the requested bandwidth, the requested level of service, and the like). If the information can be encoded in a number of bits smaller than "M" (e.g., "M-P"), the data 230 can include padded bits (e.g., "P" bits) such that the data 230 has the length "M."

The second packet structure 202 defines, for a physical layer packet, fields including the preamble 250, the header 260, the header replica 270, the data 280, and, optionally, the data replica 290. According to the second packet structure 202, the physical layer packet has also a total length of "J"

bits (e.g., has the same length as the MAC packet). In an example, the preamble 290 has a length of "K" bits (where "K" is smaller than "J") and stores a predefined pattern of "K" alternating one and zero bits, allowing communication devices to synchronize their receiver clocks, providing bit-level synchronization. Although not shown, the preamble can be preceded, be followed, and/or include a guard to mark the start and/or end of the preamble. In other words the preamble 250 can be the same as the preamble 210. The header 260 has a length of "L" bits (where "L" is smaller than "J") and stores the information indicating, among other things, the source MAC address, the destination MAC address, and the request type. To support the CRDSA and SIC contention resolution process, the header 260 also stores the signaling information. In other words, the header 260 can be the same as the header 220. The header replica 270 is a replica of the header 260 and, thus, has the same length "L" and contains the same information. The data 280 has a length of "M'" bits (where "M'" is smaller than "J") stores the information specific to the request. If no data replica is used, the length "M'" of the data 280 is such that the sum of "K," "L times the number of header replicas" and "M'" is smaller than "J"). If used, the data replica 290 is a replica of the data 280 and, thus, has a length "M'" and includes the same information. In this case, the bit length "M'" is made such that the sum of "K," "L times the number of header replicas" and "M' times the number of data replicas" is smaller than "J"). In both cases (e.g., whether the data replica 290 is used or not), the data 280 can include padded bits.

Different factors can be used to determine whether the data replica 290 is to be used or not. For instance, one factor relates to the information in the data 280 itself. In particular, if the request is associated with a certain level of service (e.g., a premium level of service), the data replica 290 is used. Another factor relates to the length "M'" of the data 280 and the number of padded bits. In particular, if a sufficient number of padded bits can be fully replaced with the data replica 290, such data replica 290 can be used.

In an example, different factors can be used to determine the number of header replicas and/or the number data replicas to use. As explained herein above, the larger the number is, the higher the SNR becomes and the higher the QoS becomes. One factor relates to conditions of the unscheduled uplink communications channel. For instance, the satellite can determine the QoS of the unscheduled uplink communications channel (e.g., based on propagation delay, packet loss, throughput, and the like) and can instruct, based on the QoS, the ground station to change (e.g., increase to improve the QoS) the number of header replicas and/or the number data replicas for the packets to be transmitted.

Figure 3:
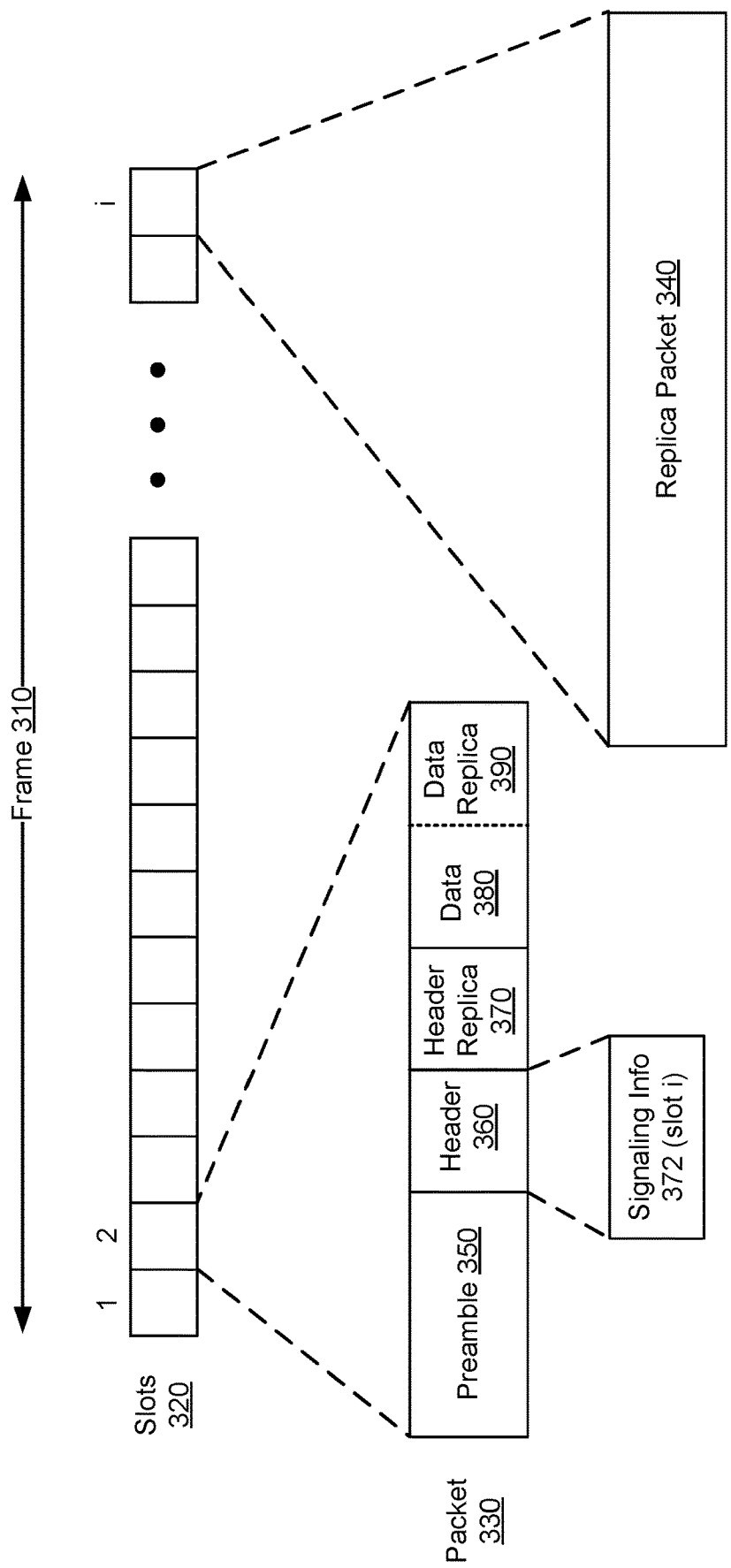
FIG. 3 illustrates an example of encoding packets in slots within a frame of a communications channel between a satellite and a ground station, according to embodiments of the present disclosure.

FIG. 3 illustrates an example of encoding packets in slots 320 within a frame 310 of a communications channel between a satellite and a ground station, according to embodiments of the present disclosure. The communications channel, the satellite, and the ground station are examples of the communications channel 110, the satellite 120 and any of the ground stations 130 and 140, respectively, of FIG. 1. The frame 310 can belong to an unscheduled uplink channel of the communications channel. A signal transmitted from the ground station encodes multiple packets, including a packet 330 and a replica packet 340. The replica packet 340 is a replica of the packet 330 in support of a contention resolution process. The packet 330 and the replica packet 340 form a packet pair. The packet 330 is sent in a first slot of the slots 320 (illustrated in FIG. 3 as slot "2"), whereas the replica packet 340 is sent in a second, different slot the slots 320 (e.g., the position of the slot within the frame 310; this slot position is illustrated in FIG. 3 as slot "i"). For the contention resolution process, the packet 330 indicates the second slot (e.g., slot "i") and the replica packet 340 indicates the first slot (e.g., slot "2").

In an example, the packet 330 is a physical layer packet that has a physical layer packet structure as the one described in connection with FIG. 2. In particular, the packet 330 includes a preamble 350, a header 360, one or more header replicas 370, data 380, and, optionally, one or more data replicas 390. The header 360 includes signaling information 372 that indicates the second slot (e.g., the signaling information 372 includes the slot position of the replica packet 340 or includes an association between the packet 330 and the replica packet 340, where this association indicates that the packet 330 is a first packet from the packet pair). Each header replica 370 includes the same signaling information given that it is a replication of the header 360. The replica packet 340 can have the same physical layer packet structure and can include the same information, except that the signaling information in its header and header replicas indicate the first slot (e.g., this signaling information includes the slot position of the packet 330 or includes an association between the replica packet 340 and the packet 330, where this association indicates that the replica packet 340 is a second, replica packet from the packet pair).

In an example, the ground stations is to transmit a request (e.g., a bandwidth request or an initial network entry request) of "k" bits in the frame 310. To do so, the ground station (e.g., a transmitter thereof) uses an error-correcting code of rate "R," such as a turbo code. A block of $1/R \times k$ bits is generated. Encoded data block is then interleaved and split into "N/2" packets and these packets are replicated to generate "N" packets. Signaling information is added to each header and its replica within a packet, according to the physical layer packet structure. Modulated packets are sent on some or all of the slots 320 within the frame 310 of the unscheduled uplink communication channel. The signaling information contain bits identifying the slot positions of the other packets of the same ground station within the frame 310. These bits can be encoded with a short code of rate "$R_s$."

Figure 4:
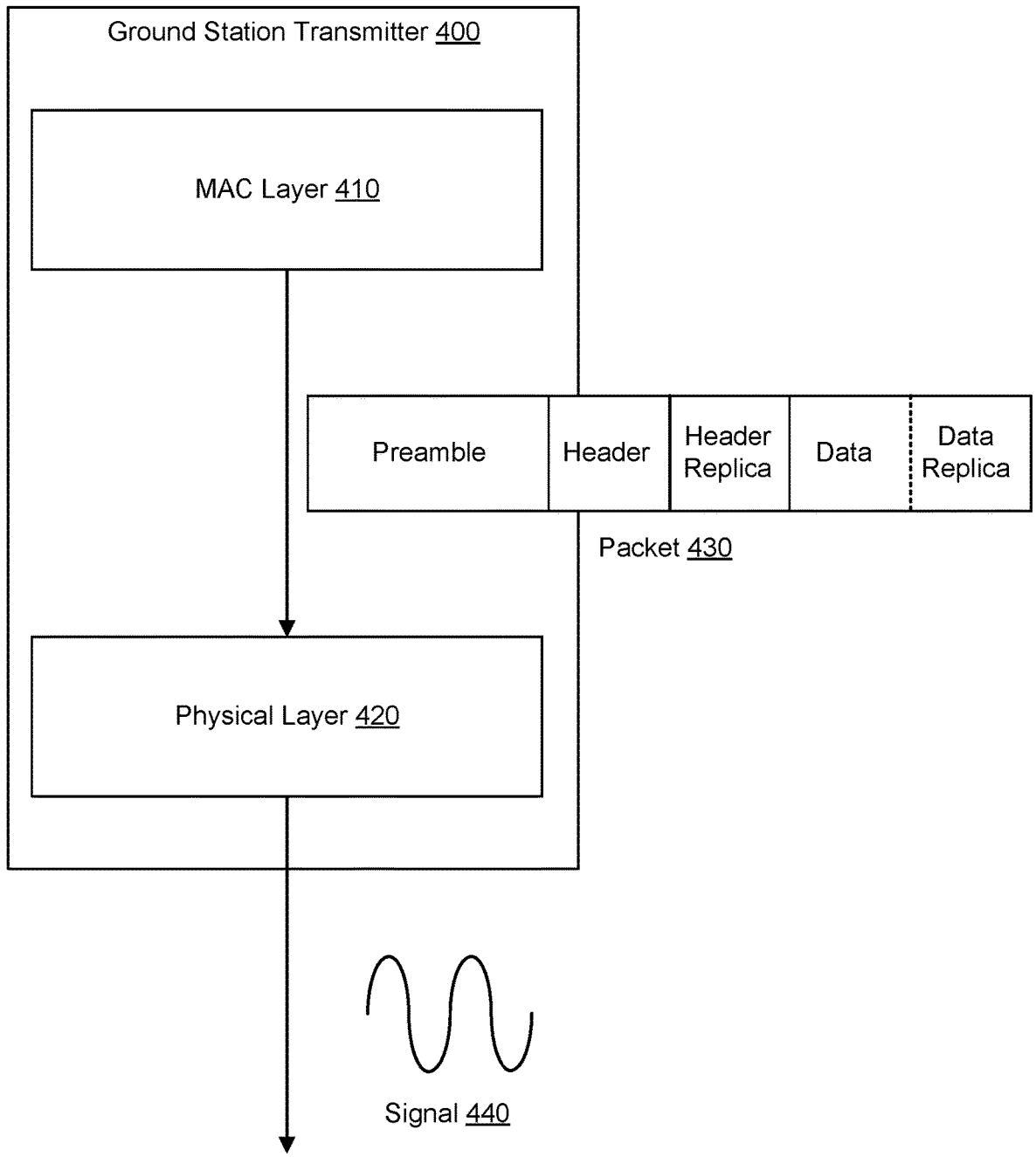
FIG. 4 illustrates an example of a ground station transceiver for encoding packets, according to embodiments of the present disclosure.

FIG. 4 illustrates an example of a ground station transceiver 400 for encoding packets, according to embodiments of the present disclosure. As illustrated, the ground station transmitter 400 includes a MAC layer 410 and a physical layer 420 according to the open systems interconnection (OSI) model. The MAC layer 410 can output bits for a packet 430 having a physical layer packet structure similar to the one described in connection with FIG. 2. The physical layer 420 encodes the bits of the packet 430 into a signal 440 for transmission. The ground station transceiver 400 includes a transmitter for the transmission from a ground station, such as any of the ground stations 130 and 140 of FIG. 1.

In an example, the physical layer 420 is responsible for the actual physical connection of the ground station transmitter 400 to the physical medium that represents the communications channel. In particular, the physical layer 420 converts MAC layer data to a format suitable for the physical medium, adds forward error correction functionality to enable error correction at the receiver, and provides a modulation module to incorporate modulation functionalities, such that bits that are output of the MAC layer 410 are converted into symbols for long distance and bandwidth efficient transmission. For instance, the physical layer 420 receives the bits of the packet 430, encodes the bits in a radio signal for transmission as the signal 440. The encoding includes a modulation, such as a phase shift keying modulation (e.g., binary phase shift keying (BPSK), quadrature phase shift keying (QPSK), or higher order phase shift keying modulation, or any other digital modulation.

The MAC layer 410 may receive information from upper layers of the OSI model and output bits for the packet 430 according to this information. The bits can correspond to a preamble, a header, one or more header replicas, data, and one or more data replicas. A cyclic redundancy check (CRC) may be added to the end of packet 430 to help with error detection. The MAC layer 410 may also incorporate an automatic repeat request (ARQ) functionality for requesting retransmission in case of errors. The MAC layer 410 also enables flow control by segmentation (at transmit end) of packets. The size of the segmentation depends on transport payload of the physical medium.

Figure 5:
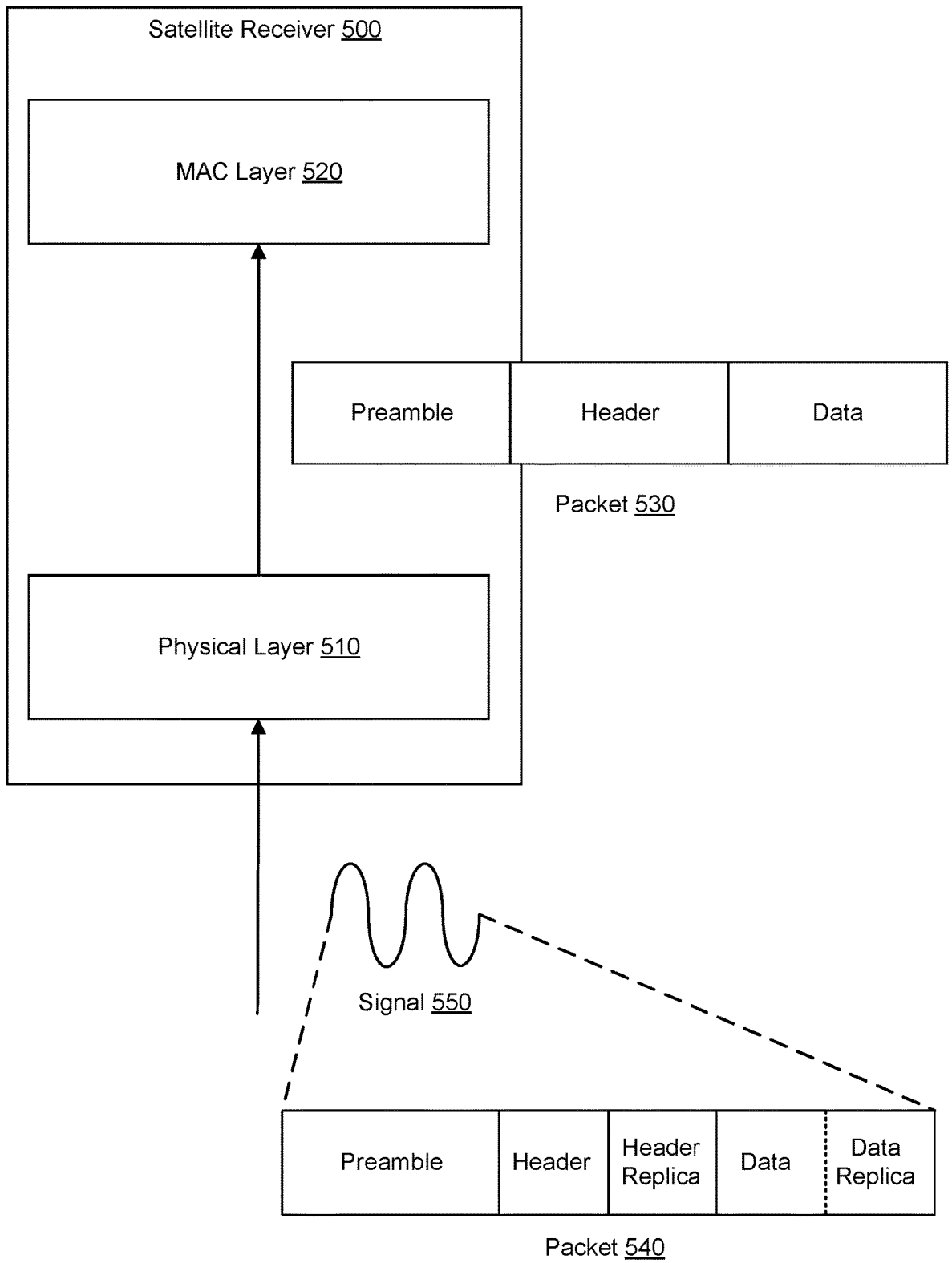
FIG. 5 illustrates an example of a satellite receiver for decoding packets, according to embodiments of the present disclosure.

FIG. 5 illustrates an example of a satellite receiver 500 for decoding packets, according to embodiments of the present disclosure. As illustrated, the satellite receiver 500 includes a physical layer 510 and a MAC layer 520 according to the OSI model. The physical layer 510 can output bits for a MAC packet 530 based on bits of a physical layer packet 540 encoded in a signal 550. The MAC packet 530 can have a MAC packet structure similar to the one described in connection with FIG. 2 (e.g., the first packet structure 201). The physical layer packet 540 can have a packet having physical layer packet structure similar to the one described in connection with FIG. 2 (e.g., the second packet structure 202). The satellite receiver 500 is an example of a receiver of the satellite 120 of FIG. 1.

In an example, the physical layer 510 is responsible for the actual physical connection of the satellite receiver 500 to the physical medium that represents the communications channel. In particular, the physical layer 510 converts the signal 550 into a MAC layer format suitable to the MAC layer 520. For instance, the signal 550 is demodulated and decoded, such bits of the physical layer packet 540 are detected and corrected as applicable. The bits of the physical layer packets 540 can be combined to form the bits of the MAC packet 530. For example, a header of the MAC packet 530 is generated based on a header and one or more header replicas of the physical layer packet 540. Similarly, data of the MAC packet 530 is generated based on data and, optionally, one or more data replicas of the physical layer packet 540. The preamble of the MAC packet 530 can be the same as the preamble of the physical layer packet 540, be transported over the physical medium, adds forward error correction functionality to enable error correction at the receiver, and provides a modulation module to incorporate modulation functionalities, such that bits that are output of the MAC layer 410 are converted into symbols for long distance and bandwidth efficient transmission. For instance, the physical layer 420 receives the bits of the packet 430, encodes the bits in a radio signal for transmission as the signal 440. The encoding includes a modulation, such as a phase shift keying modulation (e.g., binary phase shift keying (BPSK), quadrature phase shift keying (BPSK), or higher order phase shift keying modulation, or any other digital modulation.

The MAC layer 520 receives the bits forming the MAC packet 530. A CRC check and other error checks can be performed on these bits by the MAC layer 520. Re-assembly of the bits can also be performed. A contention resolution process, such as a CRDSA and SIC contention resolution process, can be performed by the MAC layer 520 or another upper layer of the satellite receiver 500.

In an example, the MAC packet 530 is generated based on the physical layer packet 540 at the physical layer 510. As explained above, the preamble of the two packets 530 and 540 can be the same. The header of the MAC packet 530 may combine the header and the header replica(s) of the physical layer packet 540. The data of the MAC packet 530 may also combine the data and the data replica(s) of the physical layer packet 540. Combining the header and its header replica(s) (and, similarly, the data and its data replica(s)) can be performed as part of the demodulation and can depend on the used modulation.

For instance, a first portion of the signal 550 encodes the header of the physical layer packet 540. Similarly, a second portion of the signal 550 encodes a header replica of the physical layer packet 540. During the demodulation, the physical layer 510 determines first in-phase and quadrature (I-Q) components from the first portion of the signal 550, determines second I-Q components from the second portion. Further, the physical layer 510 combines the first and second I-Q components by adding the in-phase components and by adding the quadrature components to generate third I-Q components. The header of the MAC packet 530 is determined based on the third I-Q components.

To illustrate, consider a QPSK modulation with a constellation of $(1, j)$ for a "1 1" symbol, $(-1, j)$ for a "0 1" symbol, $(-1, -j)$ for a "0 0" symbol, and $(1, -j)$ for a "1 0" symbol. The header of the physical layer packet 540 includes a "1 1" symbol and is modulated as having $(1, j)$ I-Q components (e.g., a "+1" for the in-phase component and a "+j" (or, equivalently, a "+1") for the quadrature component) according to the QPSK constellation. The replica of this header is modulated in a same manner (e.g., a "+1" for the in-phase component and a "+j" (or, equivalently, a "+1") for the quadrature component). Due to noise of the physical medium, the demodulation results in the first portion of the signal 550 corresponding to the header being demodulated as a $(0.45, 0.5j)$. The demodulation also results in the second portion of the signal 550 corresponding to the header replica being demodulated as a $(0.52, 0.45j)$. These two I-Q components are added, resulting in a third I-Q components of $(0.97, 0.95j)$. Given the QPSK constellation, the physical layer 510 generates two corresponding bits for the MAC header of the MAC packet 530 as being "1 1" given the closest Euclidean distance of the third I-Q components of $(0.97, 0.95j)$ to the QPSK constellation. Of course, such process can be repeated for the entire length of the header and header replica and/or for the entire length of the physical layer packet 540 and error correction can be applied to correct, as possible, errors introduced because of the channel noise.

Figure 6:
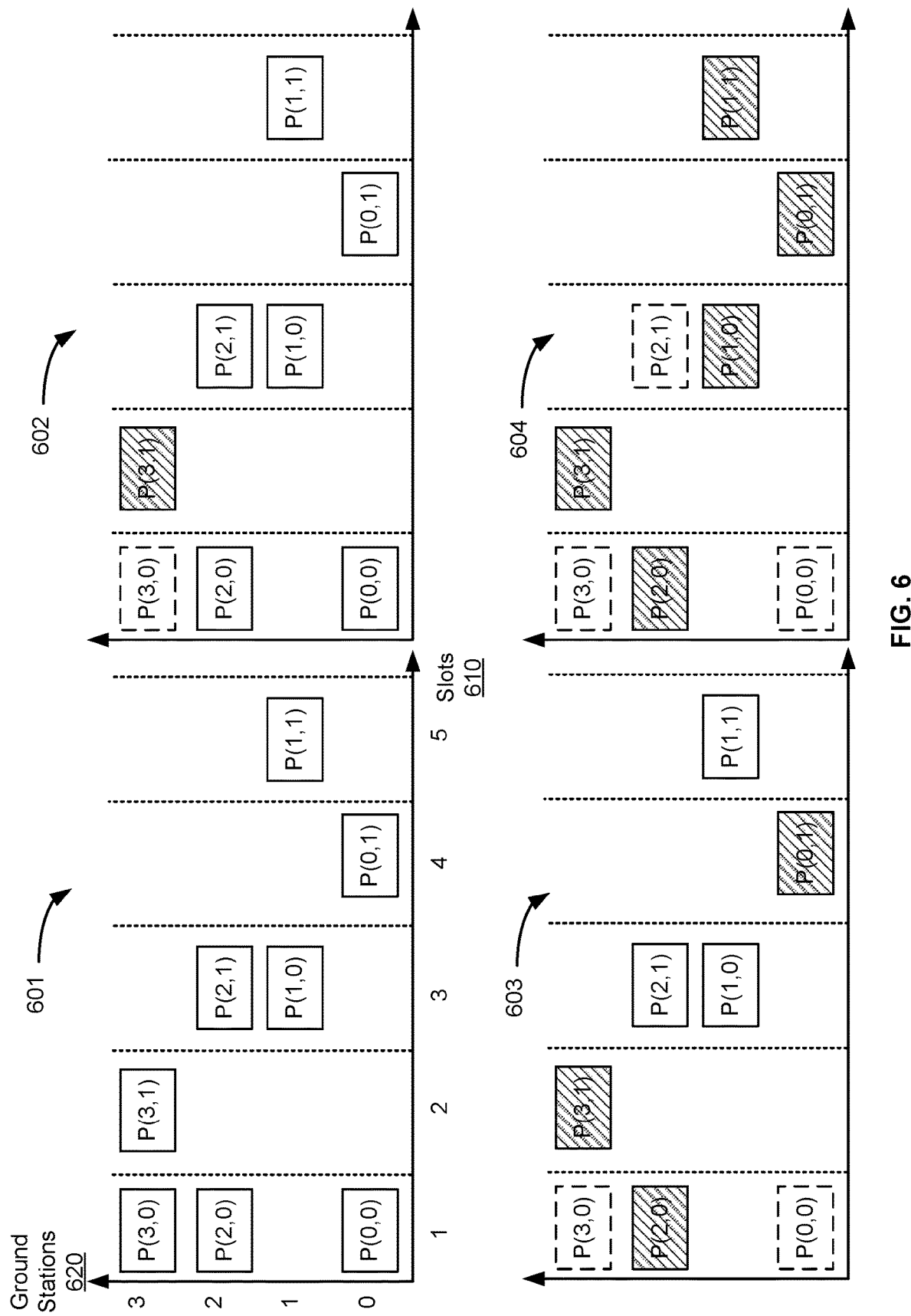
FIG. 6 illustrates an example of a contention resolution process for processing packets decoded by a satellite for a plurality of ground stations, according to embodiments of the present disclosure.

FIG. 6 illustrates an example of a contention resolution process for processing packets decoded by a satellite for a plurality of ground stations, according to embodiments of the present disclosure. In an example, transmitters of the ground stations send packets encoded in signals to a receiver of the satellite. Packets of a ground station sent in a frame of an unscheduled uplink channel can correspond to a request for one or more resources on one or more scheduled channels. Some of the packets sent by the ground stations in the frame may collide. The contention resolution process represents a process to detect and process the packet collisions such that colliding packets may be recovered and decoded. The CRDSA and SIC contention resolution process is one example of the contention resolution process. However, other examples of the contention resolution process are possible including, for instance, a diversity slotted Aloha (DSA) contention resolution process, a RACH contention resolution process, or other such processes depending on the used communication protocols.

In an example, the CRDSA operations of the CRDSA and SIC process are implemented at the transmitter (e.g., at the ground station) and transmit, in association with a packet, a replica of the packet. The packet and the replica form a pair. The SIC operations of the CRDSA and SIC process are implemented at the receiver and decode the stronger signal or collision free packet first, reconstruct a replica, subtract it from a received signal, and decode the weaker signal or other user packet.

In the illustration of FIG. 6, a frame of an unscheduled uplink channel is divided in five slots 610, enumerated as slot one, slot two, slot three, slot four, and slot five. Four ground stations 620, enumerated as ground station zero, ground station one, ground station two, and ground station three are in communications with the satellite. The four ground stations 620 send packets within the frame to the satellite requesting resources on or more scheduled channels. To support the CRDSA and SIC process, each packet has a replica packet, and these two packets form a packet pair. As explained herein above, each packet can include a header and one or more header replicas, in addition to data and, optionally, one or more data replicas. The satellite receives the signal encoding the packets and derives MAC packets, where the MAC header combines a corresponding header and its one or more header packets, and where the MAC data combines corresponding data and its one or more data replicas as applicable. Each MAC packet from a packet pair is illustrated as a packet P(i,j) where "i" indicates the sending ground station and "j" indicates whether the MAC packet is a first packet or a second packet from the packet pair (as explained herein above, "j" can additionally or alternatively indicate the slot of the other MAC packet from the packet pair).

As such, at an initial iteration 601 of the CRDSA and SIC contention resolution process (or, more specifically, of the SIC operations of this process), packets P(0,0) and P(0,1) are a packet pair that corresponds to the ground station zero, where the packet P(0,0) is the first packet of the packet pair, and where the packet P(0,1) is the second packet of the packet pair. The packet P(0,0) corresponds to slot one, whereas the packet P(0,1) corresponds to slot four. Similarly, packets P(1,0) and P(1,1) are a packet pair that corresponds to the ground station one, where the packet P(1,0) is the first packet of the packet pair, and where the packet P(1,1) is the second packet of the packet pair. The packet P(1,0) corresponds to slot three, whereas the packet P(1,1) corresponds to slot five. Packets P(2,0) and P(2,1) are a packet pair that corresponds to the ground station two, where the packet P(2,0) is the first packet of the packet pair, and where the packet P(2,1) is the second packet of the packet pair. The packet P(2,0) corresponds to slot one, whereas the packet P(2,1) corresponds to slot three. Packets P(3,0) and P(3,1) are a packet pair that corresponds to the ground station three, where the packet P(3,0) is the first packet of the packet pair, and where the packet P(3,1) is the second packet of the packet pair. The packet P(3,0) corresponds to slot one, whereas the packet P(3,1) corresponds to slot two.

At a second iteration 602 of the CRDSA and SIC contention resolution, the packets P(0,0), P(2,0), and P(3,0) are colliding and none of them can be decoded. But at slot two, a replica packet of the ground station three (e.g., the packet P(3,1) arrives without any collision and the satellite decodes it successfully. Given that the packet P(3,1) indicates that it is the second packet of the packet pair in the frame for the ground station three, the satellite can subtract the first packet P(3,0) of the packet pair at slot one. The subtraction is illustrated with a dashed line and can be performed at the physical layer of the satellite's receiver, where the signal corresponding to the packet P(3,1) at slot two can be subtracted from the signal at slot one.

Similarly, at a third iteration 603 of the CRDSA and SIC contention resolution, the packets P(0,0) and P(2,0) are still colliding and none of them can be decoded. Likewise, the packets P(2,1) and P(1,1) are colliding and node of them can be decided. But at slot four, a replica packet of the ground station zero (e.g., the packet P(0,1) arrives without any collision and the satellite decodes it successfully. Given that the packet P(0,1) indicates that it is the second packet of the packet pair in the frame for the ground station zero, the satellite can subtract the first packet P(0,0) of the packet pair at slot one. The subtraction is illustrated with a dashed line and can be performed at the physical layer of the satellite's receiver, where the signal corresponding to the packet P(0,1) at slot four can be subtracted from the remaining signal at slot one. Once that is performed, no packet collisions remain in slot one. Accordingly, the satellite can now decode the packet P(2,0) at slot one.

At a fourth iteration 604 of the CRDSA and SIC contention resolution, given that the successfully decoded packet P(2,0) indicates that it is the first packet of the packet pair in the frame for the ground station two, the satellite can subtract the second packet P(2,1) of the packet pair at slot three. The subtraction is illustrated with a dashed line and can be performed at the physical layer of the satellite's receiver, where the signal corresponding to the packet P(2, 0) at slot one can be subtracted from the signal at slot three. Once that is performed, no packet collisions remain in slot three. Accordingly, the satellite can now decode the packet P(1,0) at slot three and/or its replica packet P(1,1) arriving at slot four (because no collision occurs in slot four).

As illustrated in FIG. 6, a packet decoding with collision rely on a packet reconstruction of a replica and its reconstruction has a gain difference, a phase difference and a noise difference. If a slot time is short and the number of slots is small, then a noise can be identical and a gain difference can be negligible. But if the number of slots is pretty large and the number of ground stations is large, these noises cannot be ignored after cancellation. Because each ground station is uncorrelated, any residual signal after cancellation is a Gaussian noise and the noise power increases after cancellation. For example, the noise at slot one is higher than the noise at slot three. The noise increase is obvious if the number of ground stations is large and packet collision rate is high. If so, a packet may be detected but cannot be decoded and, thus, the PER may increase. To improve the PER and allow decoding, the SNR is increased, whereby header and, optionally, data is repeated in each transmitted packet and combined at a receiver to generate a new packet, resulting in an increase to the signal power. If there is one header replica, then SNR in header symbol will have 3 dB more. So in a random access channel, if a packet type is restricted to either bandwidth request or initial network entry request, then this replica approach can be applied to data symbol too and can decrease the PER.

Figure 7:
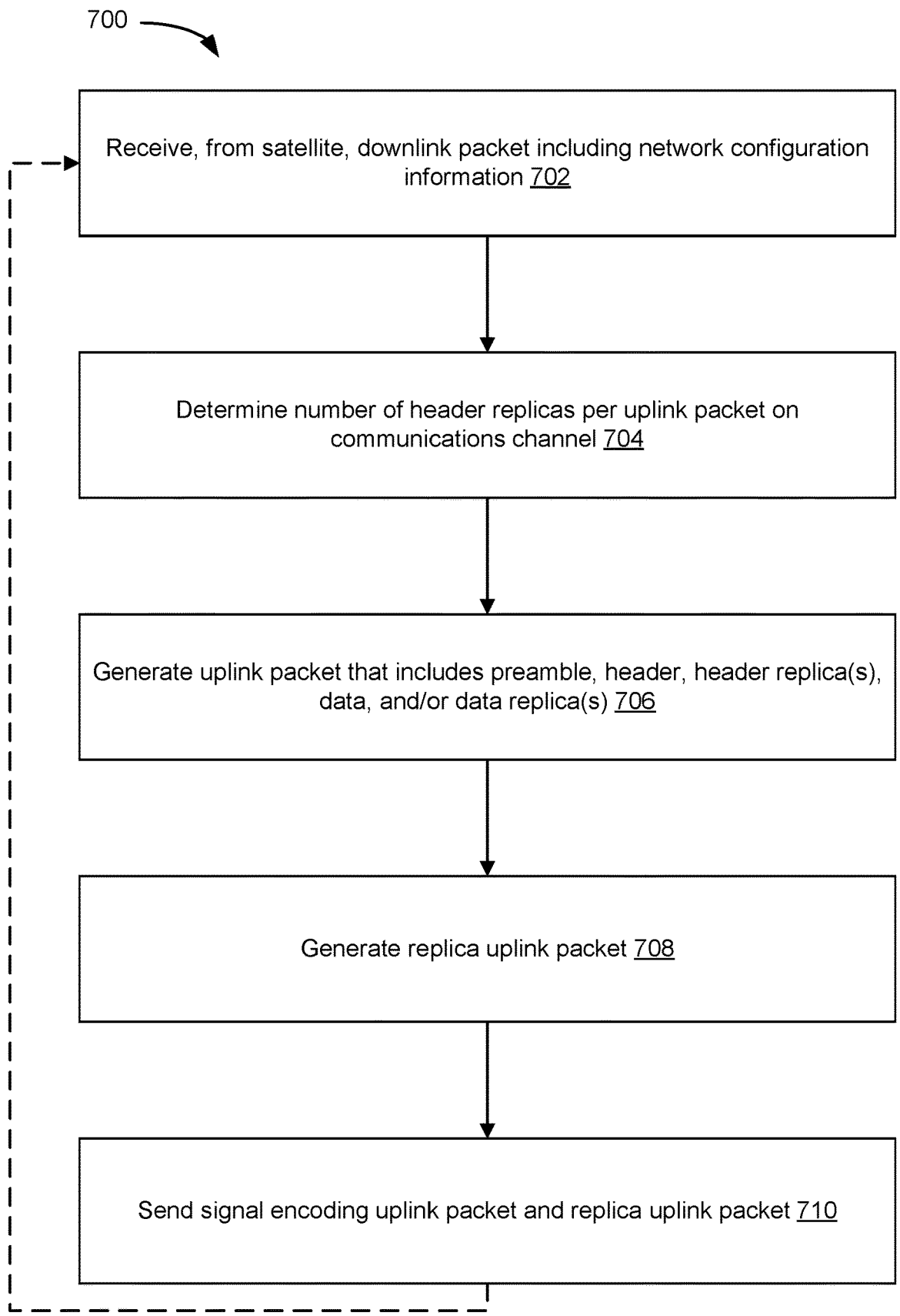
FIG. 7 illustrates an example of a flow for encoding packets into a signal and transmitting the signal from a ground station to a satellite, according to embodiments of the present disclosure.
Figure 8:
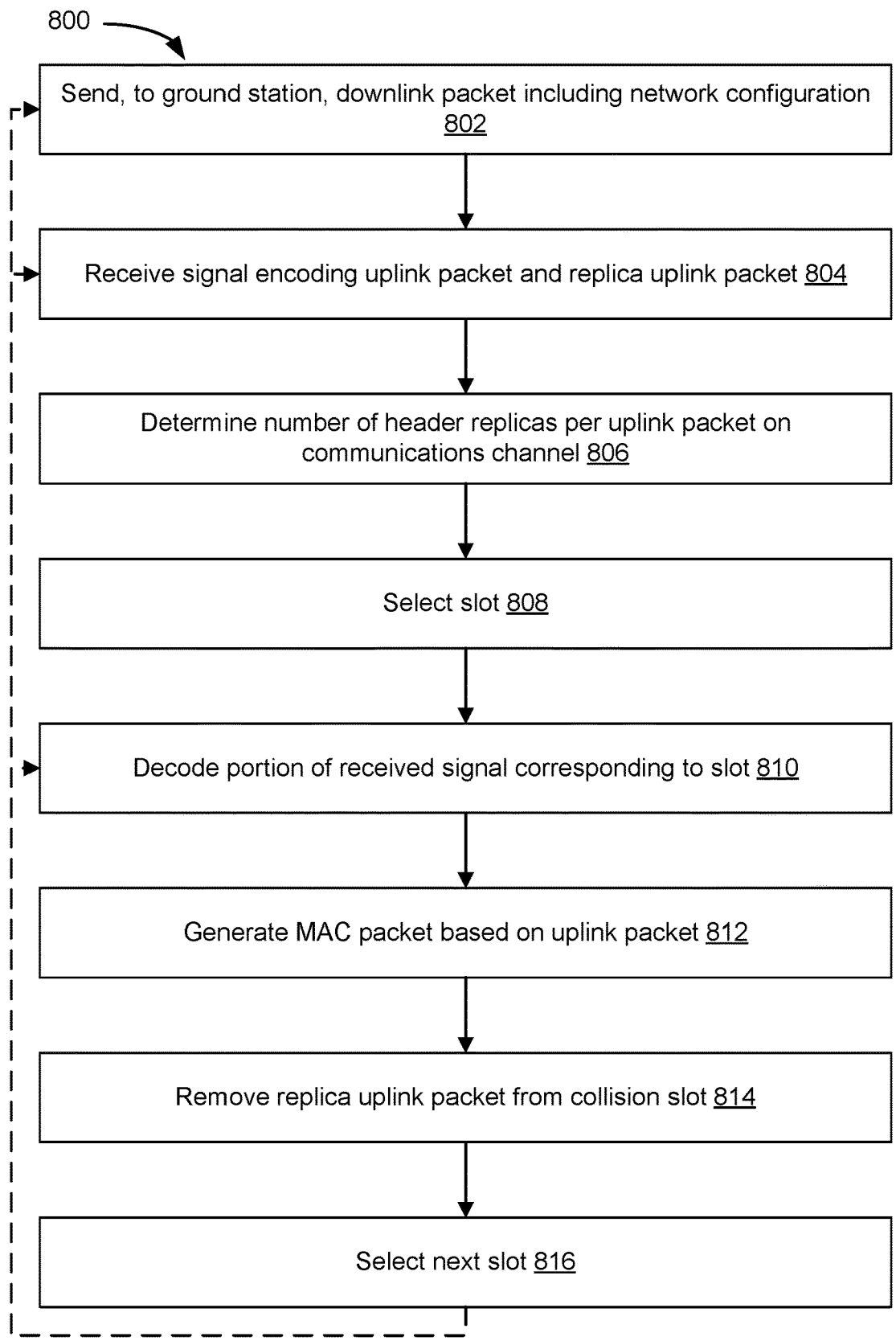
FIG. 8 illustrates an example of a flow for decoding a signal and processing packets by a satellite, according to embodiments of the present disclosure.

FIGS. 7-8 illustrate examples of flows for improving a PER associated with a random access channel, such as an unscheduled uplink channel available between a first communications system and a plurality of second communications systems that share the unscheduled uplink channel according to embodiments of the present disclosure. In the interest of clarity of explanation, a satellite is used as an example of the first communications system and includes a satellite transmitter and a satellite receiver. A ground station is used as an example of one of the second communications systems and includes a ground station transmitter and a ground station receiver (e.g., a ground station transceiver). The satellite and the ground station can be any of the satellites and ground stations described herein above in connection with FIGS. 1-6. Instructions for performing the operations of the flows can be implemented as specialized hardware, computer-readable instructions stored on an executed on specialized hardware, and/or on computer-readable instructions stored in non-transitory computer-readable media of a general purpose processor. While the operations are illustrated in a particular order, it should be understood that no particular order is necessary and that one or more operations may be omitted, skipped, and/or reordered.

FIG. 7 illustrates an example of a flow 700 for encoding packets into a signal and transmitting the signal from the ground station to the satellite, according to embodiments of the present disclosure. In an example, the flow 700 starts at an operation 702, where the ground station receives, from the satellite, one or more downlink packets include network configuration information. For instance, the ground station receiver receives a signal that encodes the one or more downlink packets from the satellite transmitter over a scheduled downlink channel. The network configuration information indicates a configuration for using uplink and downlink channels by for, instance, identifying each channel (including a random access channel) and resources of the channel including frequency bands, bandwidth, and/or other resources. In addition, the network configuration information identifies (e.g., includes) a number of header replicas (e.g., one, two, or some other number different than zero) to use for replicating a header in a packet on a random access channel, such as the unscheduled uplink channel. The network configuration information may also include a number of data replicas (e.g., one, two, or some other number different than zero) to use for replicating data in a packet on a random access channel, such as the unscheduled uplink channel. The number of header replicas and the number of data replicas may but need not be the same.

In an example, the flow 700 includes an operation 704, where the ground station determines the number of header replicas per uplink pack on a communications channel. For instance, the ground station transmitter, the ground station receiver, and/or a computer system of the ground station, processes received signal to determine the one or more downlink packets and determine the network configuration information. The processing includes demodulating the received signal and decoding the one or more downlink packets to determine the network configuration information from the data field(s) of the one or more downlink packets. The processing also identifies the number of header replicas indicated by the network configuration information. Similar processing can be performed to determine the number of data replicas to use. Other factors can be used by the ground station to determine the number of data replicas and these factors relate to the type of the request (e.g., premium service) and/or the size of the data and the number of padding bits as described herein above in connection with FIG. 2.

In an example, the flow 700 includes an operation 706, where the ground station generates an uplink packet that includes a preamble, a header, one or more replicas of the header, data, and/or replicas of the data as applicable. For instance, the ground station computer system indicates to the ground station transmitter that a request for a network bandwidth or for an initial network entry is to be transmitted to the satellite. In turn, the ground station transmitter generates bits based on the request, where such bits are encoded in the uplink packet having a physical layer packet structure similar to the one described in connection with FIG. 2 (e.g., the second packet structure 202). The preamble can include a bit pattern. The header can include a source MAC address, a destination MAC address, a type of the request, an identifier of the ground station (optionally other than the source MAC address), and signaling information for the contention resolution process including one or more of an indication that the uplink packet is a first packet in a packet pair or the slot position of a replica uplink packet of the packet pair. The data can include information specific to the request such as, for instance, a requested bandwidth, a requested number of frequency bands, a requested service level, and the like. The header can be replicated depending on the number of header replicas determined at the operation 704. The resulting replica(s) of the header can be included in the uplink packet in lieu of padding bits. The data can also be replicated depending on the number of data replication determined at the operation 704. resulting replica(s) of the data can be included in the uplink packet also in lieu of padding bits.

In an example, the flow 700 includes an operation 708, where the ground station generates a replica of the uplink packet. For instance, the ground station transmitter replicates the uplink packet such that the replica uplink packet is the same except for its signaling information. In particular, the replica uplink packet includes the same preamble, the same header and header replica(s) except for the signaling information, the same data, and/or the same data replica(s) as applicable. The signaling information in each of the header and its header replica(s) of the replica uplink packet includes one or more of an indication that the replica uplink packet is a second packet in the packet pair or the slot position of the uplink packet.

In an example, the flow 700 includes an operation 710, where the ground station sends a signal encoding the uplink packet and the replica uplink packet to the satellite. For instance, the ground station transmitter transmits such a signal to the satellite receiver. The signal modulates and encodes the uplink packet and the replica uplink packet in a first slot and a second slot, respectively, within a frame of the unscheduled uplink channel.

As illustrated with the dashed line indicating a loop back to the operation 702, the ground station can receive over time different network configuration information and can adapt the transmission of the uplink packets and their replicas on the unscheduled uplink channel accordingly. For instance, during a first time period, the network configuration information indicates that one header replica should be used in each uplink packet on the unscheduled uplink channel. During this first time period, each uplink packet and replica uplink packet of the ground station transmitter includes only one header replica, in addition to a header, a preamble, and data. During a second time period, the network configuration information indicates that two header replicas should be used in each uplink packet on the unscheduled uplink channel. During this second time period, each uplink packet and replica uplink packet of the ground station transmitter includes only two header replicas, in addition to a header, a preamble, and data. that one or more operations may be omitted, skipped, and/or reordered.

FIG. 8 illustrates an example of a flow 800 for decoding a signal and processing packets by the satellite, according to embodiments of the present disclosure. In an example, the flow 800 starts at an operation 802, where the satellite sends, to the ground station, one or more downlink packets include network configuration information. For instance, the satellite transmitter sends a signal that encodes the one or more downlink packets to the ground station receiver over a scheduled downlink channel. The network configuration information indicates a configuration for using uplink and downlink channels including, for instance, frequency bands, bandwidth, and/or other resources of such channels. In addition, the network configuration information includes a number of header replicas (e.g., one, two, or some other number different than zero) to use for replicating a header in a packet on a random access channel, such as the unscheduled uplink channel. The network configuration information may also include a number of data replicas (e.g., one, two, or some other number different than zero) to use for replicating data in a packet on a random access channel, such as the unscheduled uplink channel. The number of header replicas and the number of data replicas may but need not be the same. The satellite transmitter or a computer system of the satellite can set the number of header replicas and/or the number of data replicas based on channel conditions including, for instance, those of the unscheduled uplink channel. In particular, the satellite transmitter and/or computer system can determine the QoS of the unscheduled uplink communications channel based on one or more of a propagation delay, a packet loss, a throughput, and/or other channel measurements and can set the number the number of header replicas and/or the number of data replicas based on the QoS. For instance, if the QoS drops below a predefined measurement, the number of header replicas and/or the number of data replicas can be increased.

In an example, the flow 800 includes an operation 804, where the satellite receives a signal encoding an uplink packet and a replica uplink packet. In an example, the satellite receiver receives the signal from the ground station transmitter over the unscheduled uplink channel. The signal can encode multiple packet pairs, each of which including an uplink packet and a replica of the uplink packet, and the uplink packets and their replicas can be distributed in slots within a frame of the unscheduled uplink channel. Each slot can contain exclusively one of the uplink packets or the replica uplink packets of the ground station. The uplink packets of the ground station transmitter transmitted in the frame can indicate a request for resources on one or more scheduled channels, such as a bandwidth request or an initial network entry request. In addition, the satellite receiver can receive multiple signals from different ground stations over the unscheduled uplink channel and during the frame. Hence, packet collision may exist.

In an example, the flow 800 includes an operation 806, where the satellite determines the number of header replicas per uplink packet on a communications channel. For instance, the satellite receiver determines this number form the network configuration information. Similarly, the satellite receiver can determine the number of data replicas from the network configuration information.

In an example, the flow 800 includes an operation 808, where the satellite selects a slot within the frame to start decoding. For instance, the selection is performed for an iteration of the CDRSA and SIC contention resolution process. In particular, the satellite receiver selects the slot that has no colliding packets or the slot that has the largest SNR. For illustrative purposes and referring back to FIG. 6, the satellite receiver selects slot two because no colliding packets exist in that slot.

In an example, the flow 800 includes an operation 810, where the satellite decodes a portion of the received signal corresponding to the slot. As explained in connection with the operation 804, the received signal may correspond to a combination (e.g., a sum) of signals transmitted from the ground transmitter to the satellite receiver. The portion of the received signal corresponding to the slot encodes an uplink packet or a replica of this uplink packet from one of the ground stations (e.g., the ground station described in connection with the operation 804). The decoding can include demodulating the portion, determining in-phase and quadrature components, detecting bits based on the in-phase and quadrature components, applying an error correction process, and outputting bits corresponding to the slot.

In an example, the flow 800 includes an operation 812, where the satellite generates a MAC packet based on the uplink packet or the replica of the uplink packet as applicable (e.g., depending on the packet encoded in the slot). For instance, the decoding of the operation 810 can further include combining bits of a header with bits of the header's replica(s). The combination can be based on addition of the in-phase and quadrature components of the header and its replica(s). Similarly, the bits the data and its replica(s) can be combined. The resulting bits of the decoding can be assembled according to a MAC pack structure (e.g., the first packet structure 201 described in connection with FIG. 2) to generate the MAC packet, where this MAC packet includes a preamble, a header (but no header replicas), and data (but no data replicas).

In an example, the flow 800 includes an operation 814, where the satellite removes, from a collision slot, the replica of the uplink packet if the uplink packet was processed at the previous operations, or, conversely, removes the uplink packet if its replica was processed at the previous operations. For instance, the satellite receiver determines the MAC packet whether this packet is the first packet or the second packet of the packet pair and/or the slot position of the other MAC packet of the packet pair. The portion of the signal corresponding to the MAC packet is removed (e.g., subtracted) from the portion of the received signal corresponding to the other slot where the other MAC packet is encoded. For illustrative purposes and referring back to FIG. 6, the satellite receiver selects removes the portion of the received signal corresponding to the slot two (corresponding to the MAC packet of the operation 812) from the portion of the received signal corresponding to the slot one that encodes the other MAC packet.

In an example, the flow 800 includes an operation 816, where the satellite selects a next slot for a next iteration of the CRDSA and SIC contention resolution process. For instance, the satellite receiver selects the next slot as the one that has no colliding packets (e.g., based on a colliding packet being removed per the operation 814) or that has the next largest SNR.

As illustrated with the dashed line indicating a loop back to the operation 810, the satellite can continue performing the CRDSA and SIC contention resolution process for the remaining uplink packets and the remaining replicas thereof in the frame. Upon decoding the various uplink packets and/or replica uplink packets as applicable, the satellite's computer system can determine the request for resources sent by each of the ground stations over the unscheduled uplink channel and can allocate some or of these resources on one or more scheduled channels.

As illustrated with the dashed line indicating a loop back to the operation 804, the satellite may continue receiving one or more signals from the ground stations corresponding to other frames of the unscheduled uplink channel. Such signals and the encoded uplink packets and replicas thereof can be further processed as described herein above in connection with the operations 804-816.

As illustrated with the dashed line indicating a loop back to the operation 802, the satellite can detect a change to a channel condition and can change the number of header replicas and/or the number of data replicas to use in packets. Accordingly, the satellite receiver can send the updated number(s) to the ground stations in one or more downlink packets.

Figure 9:
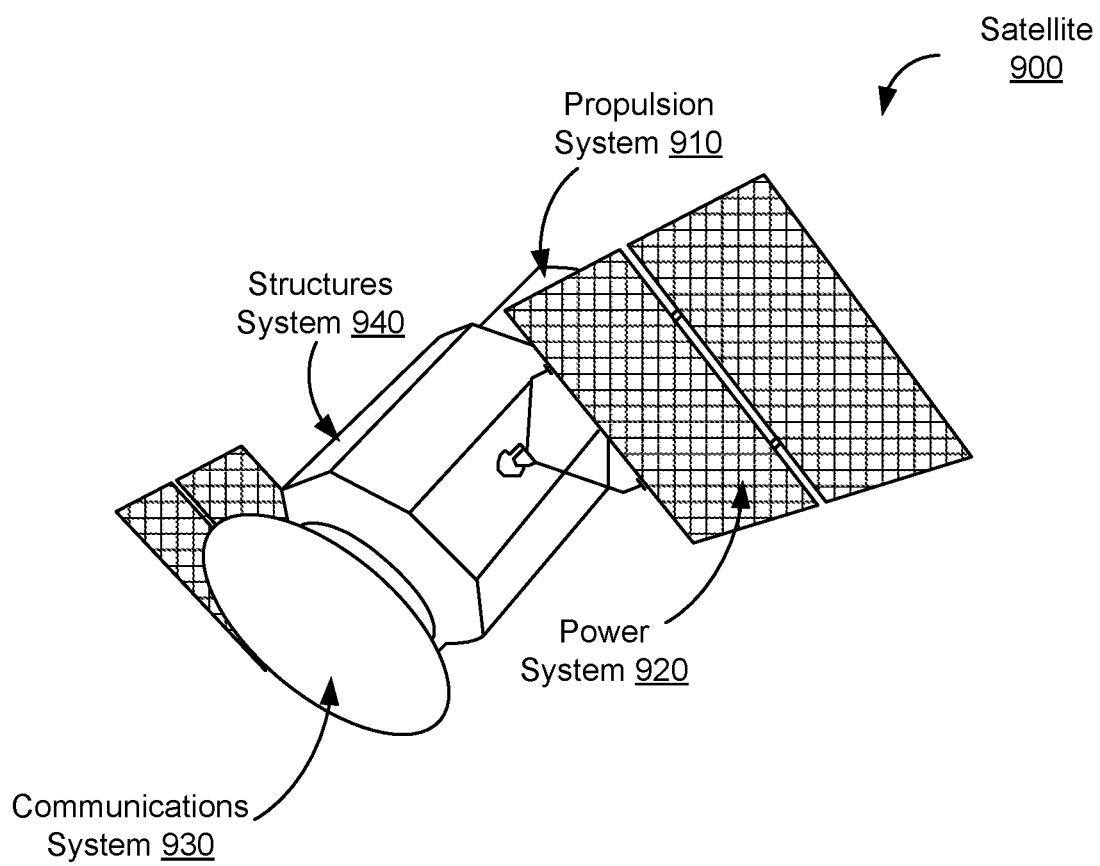
FIG. 9 illustrates an example of components of a satellite, according to embodiments of the present disclosure.

FIG. 9 illustrates an example of components of a satellite 900, according to embodiments of the present disclosure. The satellite 900 is an example of the satellite 120 of FIG. 1. As illustrated, the satellite 900 includes, among other components, a propulsion system 910, a power system 920, a communications system 930, and a structures system 940.

In an example, the propulsion system 910 includes one or more motors (e.g., rocket motors) that may move the satellite 900 in a position within an orbit. The propulsion system 910 also includes as thrusters to maintain the satellite 900 in its position. The thrusters can also be used to move the satellite 900 back into position in the orbit due to, for instance, solar wind or gravitational or magnetic forces.

In an example, the power system 920 generates electricity from the solar panels deployed on the outside of the satellite 900. The solar panels also store electricity in a set of storage batteries installed within the structures system 940. The set of storage batteries can provide power at times when the panels do not receive rays from the sun. The power is used to operate various systems of the satellite 900, including the communications system 930.

In an example, the communications system 930 handles receive and transmit functions. The communications system 930 receives signals from a source, amplifies them, and transmits them to a destination. The source can be user equipment on the Earth or another satellite. The destination is typically different from the source and includes user equipment on the Earth or another satellite.

In an example, the structures system 940 provides a stable set of structures so that the satellite 900 can be kept in position. The structures system 940 can also house components of other systems, such as subsystems of the power system 920 (e.g., the storage batteries, power converters, and the like) and subsystems of the communications system 930 (e.g., receivers, transmitters, and the like). Other components can also be housed within the structures system 940. For instance, a thermal control system is contained in the structures system 940. The thermal control system keeps components of the satellite 900 within their operational temperature ranges. A control system is also contained in the structures system 940. The control system orients the satellite 900 precisely to maintain the proper position. When the satellite gets out of position, the control system instructs the propulsion system 910 to control one or more thrusters to move the satellite 900 back in position. The control system also includes tracking, telemetry, and control subsystems for monitoring vital operating parameters of the satellite 900, telemetry circuits for relaying this information to user equipment on the Earth, a system for receiving and interpreting commands sent to the satellite 900 from the user equipment or another satellite, and a command system for controlling the operation of the satellite 900.

Figure 10:
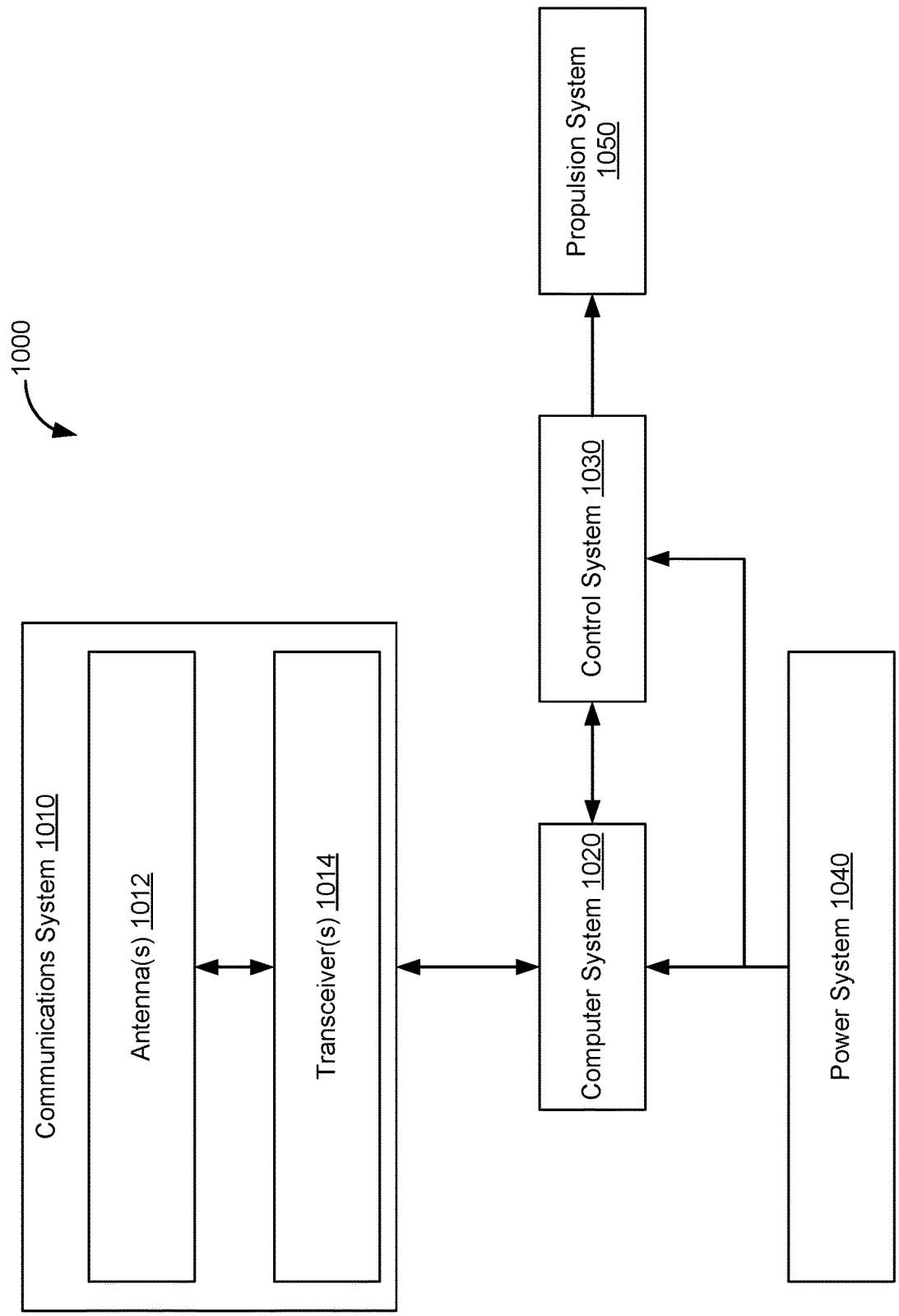
FIG. 10 illustrates an example of components of systems a satellite, according to embodiments of the present disclosure.

FIG. 10 illustrates an example of components of systems 1000 of a satellite, according to embodiments of the present disclosure. The satellite can be any of the satellites described herein above in connection with FIGS. 1-9. As illustrated, the systems 1000 include a communications system 1010, a computer system 1020, a control system 1030, a power system 1040, and a propulsion system 1050.

In an example, the communications system 1010 provides communications with other satellites and/or user equipment such as ground stations. The communications system 1010 can include a set of antennas 1012 and a set of transceivers 1014. The set of antennas 1012 supports radio frequencies within a desired frequency spectrum and can be a phased area of antenna elements. The transceivers 1014 can be components of a transponder of the satellite and can include a set of satellite receivers and a set of satellite transmitters. The satellite transmitter(s) may, for example, multiplex, encode, and compress data to be transmitted, then modulate the data to a desired radio frequency and amplify it for transmission over the set of antennas 1012. Multiple channels can be used, in addition to error correction coding. The satellite receiver(s) demodulates received signals and performs any necessary de-multiplexing, decoding, decompressing, error correction and formatting of the signals from set of antennas 1012, for use by the computer system 1020. The set of antennas 1012 and/or the set of transceivers 1014 may also include switches, filters, low-noise amplifiers, down converters (for example, to an intermediate frequency and/or baseband), and/or other communications components. Data decoded by the satellite receiver(s) can be output to the computer system 1020 for further processing. Conversely, an output of the computer system 1020 can be provided to the satellite transmitter(s) for transmission.

The computer system 1020 can be communicatively coupled with the communications system 1010, the control system 1030, and the power system 1040. In an example, the computer system 1020 provides controls over and/or receives and processes data of the communications system 1010, the control system 1030, and the power system 1040. For instance, the computer system can process communications data of the communications system 1010, outputs attitude and position information to the control system 1030, and outputs power distribution controls to the power system 1040.

In an example, the control system 1030 maintains the satellite in a proper position within an orbit by instructing the propulsion system 1050 to control thrusters and orient the satellite precisely to maintain the proper position. Maintaining the orbit may also include maintaining the desired nodal separations between itself and the other satellites within the satellite constellation. For instance, the control system 1030 includes tracking, telemetry, and processors for calculating and/or receiving attitude and/or orbit adjustment information.

The power system 1040 provides electrical power to other ones of the systems 1000 including the communications system 1010, the computer system 1020, the control system 1030, and the propulsion system 1050. The power system 1040 may, for example, include one or more solar panels and a supporting structure, and one or more batteries. Telemetry circuits and processors of the power system 1040 can monitor the power collection and the power consumption and can control the collection and the distribution of the electrical power to the other ones of the systems 1000.

The propulsion system 1050 may include a set of motors and set of thrusters. The propulsion system 1050 may also include a set of fuel sources, such as fuel and oxidant tanks, battery cells, liquid fuel rocket, and/or an ion-thruster system. Telemetry circuits and processors of the propulsion system 1050 can control operations of the motors, thrusters, and/or fuel sources to move and orient the satellite.

In an example, the computer system 1020 (and, similarly, the remaining ones of the systems 1000) includes at least a processor, a memory, a storage device, communication peripherals, and an interface bus. The interface bus is configured to communicate, transmit, and transfer data, controls, and commands among the various components of the computer system 1020. The memory and the storage device include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory and the storage device also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1020.

Further, the memory includes an operating system, programs, and applications. The processor is configured to execute the stored instructions and includes, for example, a logical processing unit, a microprocessor, a digital signal processor, and other processors. The communication peripherals are configured to facilitate communication between the computer system 1020 and remaining ones of the systems 1000 and include, for example, a communications bus and/or a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate.

For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A satellite and ground communications system comprising:
a satellite comprising a satellite transmitter and a satellite receiver; and
a ground station transceiver, wherein:
the satellite transmitter is configured to transmit a downlink packet to the ground station transceiver, the downlink packet identifying a random access channel usable by the ground station transceiver to transmit packets requesting network bandwidth, the downlink packet further identifying, for each packet, a number of replicas of a header in the packet, the number equal to or greater than one;
the ground station transceiver is configured to:
determine the number of replicas,
generate a first packet that comprises a first header and a first replica of the first header,
generate a second packet that comprises a second header and a second replica of the second header, and
transmit, to the satellite receiver over the random access channel, the first packet in a first slot of a frame and the second packet in a second slot of the frame, the first header comprising a position of the second slot in the frame, the second header comprising a position of the first slot in the frame; and
the satellite receiver is configured to:
generate a first media access control (MAC) header for a first MAC packet that corresponds to the first packet, the first MAC header generated based on the first header and the first replica and comprising the position of the second slot,
generate a second MAC header for a second MAC packet that corresponds to the second packet, the second MAC header generated based on the second header and the second header replica and comprising the position of the first slot, and
perform a contention resolution diversity slotted Aloha (CRDSA) and successive interference cancellation (SIC) process on the first MAC packet and the second MAC packet based on the position of the first slot and the position of the second slot.

2. The satellite and ground communications system of claim 1, wherein the first packet is transmitted by encoding the first packet in a signal and transmitting the signal, and wherein the first MAC header is generated by at least:
determining, from the signal, first in-phase and quadrature (I-Q) components corresponding to the first header and second I-Q components corresponding to the first replica;
generating I-Q components corresponding to the first MAC header by adding the first I-Q components and the second I-Q components; and
determining the first MAC header based on the I-Q components.

3. The satellite and ground communications system of claim 1, wherein the downlink packet further identifies, for each packet, a number of replicas of data in the packet, wherein the first header of the first packet comprises a network bandwidth request, wherein the first packet further comprises first data indicating a service level for the network bandwidth request and a replica of the first data.

4. A system comprising:
one or more processors; and
one or more memories storing computer-readable instructions that, upon execution by the one or more processors, configure the system to:
receive a first packet in a first slot of a frame and a second packet in a second slot of the frame, the first packet comprising a first header and a replica of the first header, the first header indicating the second slot;
generate a second header based at least in part on the first header and the replica, the second header indicating the second slot;
generate a third packet that includes the second header; and
perform, based at least in part on the third packet, a contention resolution process on packets associated with slots of the frame, at least one of the slots comprising two or more packets.

5. The system of claim 4, wherein the system comprises a satellite, wherein the first packet and the second packet are received from a ground station, wherein the one or more memories store further computer-readable instructions that, upon execution by the one or more processors, configure the system to:
transmit, to the ground station, a downlink packet indicating a number of header replicas per packet to transmit over a random access channel.

6. The system of claim 5, wherein the replica of the first header is included in the first packet based at least in part on the number of header replicas, and wherein the second header is generated based at least in part on the number of header replicas.

7. The system of claim 5, wherein the one or more memories store additional computer-readable instructions that, upon execution by the one or more processors, configure the system to:
transmit, to the ground station, a second downlink packet indicating a second number of header replicas per packet;
receive, from the ground station, a fourth packet that comprises a third header and a plurality of replicas of the third header, the plurality of replicas included in the fourth packet based at least in part on the second number of header replicas; and
generate a fourth header based at least in part on the third header and the plurality of replicas.

8. The system of claim 4, wherein the first packet is received by receiving a signal that encodes the first packet, and wherein the second header is generated by at least:
determining, by at least decoding the signal, a first symbol corresponding to the first header and a second symbol correspond to the replica; and
generating, based at least in part on the first symbol and the second symbol, a symbol corresponding to the second header.

9. The system of claim 8, wherein the symbol is generated by at least determining in-phase and quadrature (I-Q) components of the symbol as a combination of first I-Q components of the first symbol and second I-Q components of the second symbol.

10. The system of claim 4, wherein the third packet is generated as a media access control (MAC) packet by a physical layer of the system, wherein the first packet and the MAC packet have different packet structures, and wherein the content resolution process is performed by a MAC layer of the system.

11. The system of claim 4, wherein the first packet further comprises first data and a replica of the first data, and wherein the one or more memories store additional computer-readable instructions that, upon execution by the one or more processors, configure the system to:
generate second data based at least in part on the first data and the replica of the first data, wherein the third packet further comprises the second data.

12. The system of claim 4, wherein the first packet has a first length and comprises (i) a preamble, (ii) a first header field having a second length and comprising the first header, and (iii) a second header field having the second length and comprising the replica, wherein the third packet has the first length and comprises the preamble and a third header field having the second length and comprising the second header.

13. The system of claim 12, wherein the first packet further comprises a first data field having a fourth length, wherein the third packet further comprises second data field having a fifth length larger than the fourth length.

14. The system of claim 4, wherein the one or more memories store additional computer-readable instructions that, upon execution by the one or more processors, configure the system to:
generate a fourth packet based at least in part on the second packet, the fourth packet corresponding to the second slot in the frame and indicating the first slot, wherein the contention resolution process is performed on the third packet and the fourth packet.

15. A method implemented by a system, the method comprising:
determining a number of header replicas per packet to send in a frame;
generating, based at least in part on the number of header replicas, a first packet that comprises a first header and a first replica of the first header;
generating, based at least in part on the number of header replicas, a second packet that comprises a second header and a second replica of the second header; and
transmitting the first packet in a first slot of the frame, the second packet in a second slot of the frame, the first header indicating the second slot, the second header indicating the first slot.

16. The method of claim 15, wherein the first packet and the second packet are transmitted to a satellite, and wherein the method further comprises:
receiving, from the satellite, an indication of a second number of header replicas to use;
generating, based at least in part on the indication, a third packet that comprises a third header and a plurality of replicas of the third header; and
transmitting the third packet in a third slot of a second frame.

17. The method of claim 15, wherein the first header indicates a type of a request associated with a communications channel, and wherein generating the first packet comprises generating data about the request and a replica of the data, wherein the first packet further comprises the data and the replica of the data.

18. The method of claim 15, wherein the first packet has a packet length, and wherein generating the first packet comprises:
generating data about a request associated with a communications channel, the data having a data length; and
generating, based on the packet length and the data length, a replica of the data, wherein the first packet further comprises the data and the replica of the data.

19. The method of claim 15, wherein the first header indicates a bandwidth request on a communications channel, and wherein generating the first packet comprises generating data about a requested bandwidth on the communications channel, wherein the first packet further comprises the data and a replica of the data.

20. The method of claim 15, wherein the first header indicates a network entry request on a communications channel, and wherein generating the first packet comprises generating data about the network entry request, wherein the first packet further comprises the data and a replica of the data.

* * * * *